(12) United States Patent
Hoshino et al.

(10) Patent No.: US 10,358,031 B2
(45) Date of Patent: Jul. 23, 2019

(54) REACTION FORCE GENERATING APPARATUS

(71) Applicant: Mitsuba Corporation, Gunma (JP)

(72) Inventors: Terumasa Hoshino, Gunma (JP);
Tsuyoshi Maruyama, Gunma (JP);
Yohei Inagaki, Gunma (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 0 days.

(21) Appl. No.: 15/562,626

(22) PCT Filed: Mar. 18, 2016

(86) PCT No.: PCT/JP2016/058841
§ 371 (c)(1),
(2) Date: Sep. 28, 2017

(87) PCT Pub. No.: WO2016/158528
PCT Pub. Date: Oct. 6, 2016

(65) Prior Publication Data
US 2018/0086204 A1    Mar. 29, 2018

(30) Foreign Application Priority Data
Jul. 22, 2015    (JP) .................................. 2015-144646

(51) Int. Cl.
*G05G 1/30*        (2008.04)
*B60K 26/02*       (2006.01)
(Continued)

(52) U.S. Cl.
CPC ............ *B60K 26/02* (2013.01); *B60K 26/021* (2013.01); *B60W 50/16* (2013.01); *F02D 11/02* (2013.01);
(Continued)

(58) Field of Classification Search
CPC ... B60T 7/04; B60K 26/021; B60K 2026/023; G05G 1/30; G05G 1/40; G05G 1/405;
(Continued)

(56) References Cited

U.S. PATENT DOCUMENTS 5,624,109 A  *  4/1997  Tanaka ................. B65H 3/0669
                                                      271/10.13
8,167,768 B2 *  5/2012  Hartmann .............. B62M 11/16
                                                      475/296
(Continued)

FOREIGN PATENT DOCUMENTS

JP          55-59561 U1    4/1980
JP          55-106466 U1   7/1980
(Continued)

OTHER PUBLICATIONS

International Search Report for PCT Serial No. PCT/JP2016/058841 dated Jun. 1, 2016.
(Continued)

*Primary Examiner* — Jeremy R Severson
(74) *Attorney, Agent, or Firm* — McCormick, Paulding & Huber LLP

(57) ABSTRACT

It is an object of the present invention to provide a reaction force generating apparatus which can be improved in size and weight. In the reaction force generating apparatus (10) having: an arm (44) which is rotated by a load, and an electric motor (12) for applying a reaction force to the arm (44), the reaction force generating apparatus (10) further has: a support shaft (32) which is rotatably installed in a transmission passage (14) through which a reaction force is transmitted to the arm (44); a gear (36) which is rotatably attached to the support shaft (32); a sector gear (40) which is disposed on a downstream side of the transmission passage (14) from the gear (36), and coupled to the gear (36); an output shaft (38) which is rotatably installed in the
(Continued)

transmission passage (14), and to which the sector gear (40) and the arm (44) are attached; and a one-way clutch (37) which is interposed between the support shaft (32) and the gear (36) in the transmission passage (14), wherein the one-way clutch (37) has: an engaged state in which, when the gear (36) is rotated in a first direction, the one-way clutch (37) connects the transmission passage (14) to the arm (44); and a released state in which, when the gear (36) is rotated in a second direction, the one-way clutch (37) blocks the transmission passage (14), and the sector gear (40) has a meshing portion (40B) formed within a specific angular range in a rotation direction.

13 Claims, 8 Drawing Sheets

(51) Int. Cl.
  *F02D 11/10*   (2006.01)
  *G05G 5/03*   (2008.04)
  *F02D 11/02*   (2006.01)
  *B60W 50/16*   (2012.01)
  *G05G 1/40*   (2008.04)

(52) U.S. Cl.
  CPC ............ *F02D 11/10* (2013.01); *F02D 11/106* (2013.01); *G05G 1/30* (2013.01); *G05G 5/03* (2013.01); *B60K 2026/023* (2013.01); *G05G 1/40* (2013.01)

(58) Field of Classification Search
  CPC ......... Y10T 74/20888; Y10T 74/20528; Y10T 74/20534; B60W 50/16
  See application file for complete search history.

(56) References Cited

U.S. PATENT DOCUMENTS

| | | | |
|---|---|---|---|
| 9,229,469 B2 * | 1/2016 | Maruyama | G05G 1/30 |
| 9,605,743 B2 * | 3/2017 | Canto Michelotti | ............... |
| | | | F16D 41/206 |
| 9,815,367 B2 * | 11/2017 | Maruyama | B60K 26/021 |
| 2012/0169488 A1 | 7/2012 | Thiel et al. | |
| 2013/0091977 A1 | 4/2013 | Fukushima et al. | |
| 2014/0373668 A1 | 12/2014 | Maruyama et al. | |
| 2018/0010683 A1 * | 1/2018 | Kouzuma | B60K 26/02 |

FOREIGN PATENT DOCUMENTS

| | | |
|---|---|---|
| WO | 2013/099581 A1 | 7/2013 |
| WO | 2014/058055 A1 | 4/2014 |

OTHER PUBLICATIONS

Extended European Search Report for Serial No. EP 16 772 410.3 dated Feb. 18, 2019.

* cited by examiner

REACTION FORCE GENERATING APPARATUS

CROSS-REFERENCE TO RELATED APPLICATIONS

This application is a National Stage application of International Patent Application No. PCT/JP2016/058841, filed on Mar. 18, 2016, which claims priority to Japanese Patent Application No. 2015-075614, filed on Apr. 2, 2015, and Japanese Patent Application No. 2015-144646 filed on Jul. 22, 2015, each of which is hereby incorporated by reference in its entirety.

TECHNICAL FIELD

The present invention relates to a reaction force generating apparatus for applying a reaction force to a rotation member which is subjected to a load.

In addition, the present invention relates to a reaction force apparatus for applying a reaction force against a stepping-on force to a pedal which is stepped on by a driver.

BACKGROUND ART

A conventionally-known reaction force generating apparatus is configured to apply a reaction force to a rotation member which is subjected to a load, and one example of the reaction force generating apparatus is disclosed in International Publication No. 2013/099581. The reaction force generating apparatus disclosed in International Publication No. 2013/099581 applies a reaction force in a returning direction of a pedal member to the pedal member which is stepped on by a driver. The reaction force generating apparatus has: an arm through which the load is transmitted from the pedal member; a transmission member for rotatably supporting the arm; and a motor for applying a torque serving as a "reaction force" to the transmission member. Furthermore, the reaction force generating apparatus disclosed in International Publication No. 2013/099581 has first to third deceleration sections installed along a transmission passage from the motor to the transmission member.

The reaction force generating apparatus comprises: a pinion gear which is coupled to the rotor of a motor; and a first gear which is rotatably supported by a first support shaft. The pinion gear is meshed with the first gear. The pinion gear and the first gear correspond to the first deceleration section. The reaction force generating apparatus further comprises: a second gear which is integrally rotated with the first gear; and a third gear which is rotatably supported by a second support shaft. The second gear is meshed with the third gear, and the second gear and the third gear correspond to the second deceleration section.

The reaction force generating apparatus further comprises: a fourth gear which is integrally rotated with the third gear; and a fifth gear attached to the transmission member. The fourth gear is meshed with the fifth gear, and the fourth gear and the fifth gear correspond to the third deceleration section. The fifth gear is attached to the transmission member through a one-way clutch. The reaction force generating apparatus further comprises a return spring which applies a force in a rotation direction to the transmission member.

In the reaction force generating apparatus disclosed in International Publication No. 2013/099581, when a load applied to the pedal member is transmitted to the arm, the one-way clutch is engaged with the arm. For this reason, the torque of the rotating fifth gear is transmitted to the motor through the third to first deceleration sections. In contrast, a torque generated as a "reaction force" by the motor is transmitted to the arm through the first to third deceleration sections, and the reaction force in accordance with an operation force is applied to the pedal member.

When the load is released from the pedal member, the arm returns to its original position by the return spring. When the arm returns to its original position, the one-way clutch is released from the arm. For this reason, the torque of the arm is not transmitted to the motor.

International Publication No. 2013/099581 discloses a reaction force apparatus (reaction force pedal apparatus) which applies a reaction force against a stepping-on force to an accelerator pedal in accordance with the stepping-on force of the accelerator pedal. The reaction force apparatus comprises: a motor, a multistage deceleration mechanism for decelerating the rotation of the motor: and an arm which transmits an output of the multistage deceleration mechanism to the accelerator pedal.

When the driver steps on the accelerator pedal so as to pivot the accelerator pedal, the motor installed in the reaction force apparatus is designed to output a rotation force (torque) for pivoting the arm in an opposite direction. The torque outputted from the motor is transmitted to the arm through the multistage deceleration mechanism, and further transmitted to the accelerator pedal through the arm.

The above-mentioned multistage deceleration mechanism is a three-stage deceleration mechanism including: a first gear (input gear) meshed with a pinion gear fixed to the motor shaft; a second gear meshed with the first gear; and a third gear (output gear) meshed with the second gear. The first deceleration section is constituted by the pinion gear and the first gear, the second deceleration section is constituted by the first gear and the second gear, and the third deceleration section is constituted by the second gear and the third gear. The third gear serving as the output gear of the multistage deceleration mechanism is installed on a driving shaft having one end coupled with the arm.

SUMMARY

In the reaction force generating apparatus disclosed in International Publication No. 2013/099581, a rotation angle of a transmission member is set to a constant rotation angle in accordance with the rotation angle of a pedal member. However, the fifth gear is attached to a transmission member through a one-way clutch, when the pedal member is stepped on to rotate the transmission member in a first direction, the fifth gear is rotated in the first direction. Even when the load of the pedal member is released to rotate the transmission member in a second direction, the fifth gear is stopped. When a load is again applied to the pedal member to rotate the transmission member in the first direction, the fifth gear is rotated in the first direction from its stop position. That is, when an operation for applying a load to the pedal member and an operation for releasing the load from the pedal member are repeated, the fifth gear is rotated by 360 degrees or more. Therefore, the fifth gear needs to be formed along the entire circumference, thereby causing a problem that the size of the fifth gear becomes bulky in the radial direction of the transmission member.

The deceleration mechanism provided in the reaction force generating apparatus disclosed in International Publication No. 2013/099581 is a multistage deceleration mechanism including three deceleration sections. Therefore, even when an output of the motor is small, a sufficient reaction force (torque) required for the accelerator pedal can be applied. On the other hand, in general, the multistage deceleration mechanism has a large size, thereby making the entire reaction force apparatus including the multistage deceleration mechanism bulky. More specifically, in the reaction force generating apparatus disclosed in International Publication No. 2013/099581, since the motor shaft, the rotation shaft of the first gear, the rotation shaft of the second gear, and the rotation shaft (driving shaft) of the third gear are disposed in parallel with one another, with their positions deviated in the axial direction, this apparatus has a dimension enlarged in particular in the axial direction.

An object of the present invention is to provide a reaction force generating apparatus which can be reduced in size in the radial direction of the transmission member.

Another object of the present invention is to provide a reaction force generating apparatus reduced in size, thereby improving the freedom degree in layout designing at the time of a mounting process on a vehicle.

According to one aspect of the present invention, there is provided a reaction force generating apparatus comprising: a rotation member which is rotated by a load; and a motor which applies a reaction force in a direction opposite to a rotation direction of the rotation member to the rotation member, the reaction force generating apparatus further comprising: a support member which is rotatably installed in a transmission passage through which a reaction force generated by the motor is transmitted to the rotation member; a first gear which is rotatably attached to the support member; a second gear which is disposed on a downstream side of the transmission passage from the first gear, and coupled to the first gear; a transmission member which is rotatably installed in the transmission passage, and to which the second gear and the rotation member are attached; and a one-way clutch which is interposed between the support member and the first gear in the transmission passage, wherein the one-way clutch has: a state in which, when a load is applied to the rotation member to rotate the first gear in a first direction, the one-way clutch connects the transmission passage to the rotation member; and a state in which, when the load applied to the rotation member is released from the rotation member to rotate the first gear in a second direction, the one-way clutch blocks the transmission passage, the second gear is a sector gear, the reaction force generating apparatus further comprises a deceleration mechanism for decelerating a rotation to be transmitted to the rotation member from the motor, the deceleration mechanism is a one-stage deceleration mechanism having: the first gear serving as an input gear; and the second gear serving as an output gear, the reaction force generating apparatus further comprises: a motor case in which the motor is accommodated; and a gear case which is fixed to a front face of the motor case, the motor case and the gear case are disposed within a range of an axial dimension of the rotation shaft in the direction along the rotation shaft, the rotation member is disposed within the range of the axial dimension of the rotation shaft.

According to another aspect of the present invention, wherein an output shaft of the deceleration mechanism is disposed, the output shaft is rotatably supported by two ball bearings, and the rotation member and the second gear are provided to the output shaft.

According to another aspect of the present invention, at least one portion of the output gear of the deceleration mechanism and at least one portion of the motor are overlapped with each other in the direction of the rotation shaft of the motor.

According to another aspect of the present invention, the reaction force generating apparatus further comprises a rotation mechanism in which, when the load applied to the rotation member is released from the rotation member, the first gear is rotated in the second direction.

According to another aspect of the present invention, the rotation member receives a load applied to the accelerator pedal installed in a vehicle.

According to another aspect of the present invention, in the reaction force generating apparatus, the deceleration mechanism is a one-stage deceleration mechanism having: the first gear serving as an input gear; and the second gear serving as an output gear.

According to another aspect of the present invention, in the reaction force generating apparatus, the rotation member is disposed between one end of the rotation shaft and the other end of the rotation shaft in the direction of the rotation shaft of the motor.

According to another aspect of the present invention, in the reaction force generating apparatus, the first gear is fixed to the rotation shaft of the motor, and the rotation member is disposed between one end of the rotation shaft and the other end of the rotation shaft in a direction of the rotation shaft.

According to another aspect of the present invention, in the reaction force generating apparatus, a dimension in the direction of the rotation shaft of the motor is smaller than a dimension in a radial direction of the motor.

According to another aspect of the present invention, in the reaction force generating apparatus, the second gear is fixed to the output shaft of the deceleration mechanism, the rotation shaft of the motor and the output shaft of the deceleration mechanism are disposed in parallel with each other, and the output shaft of the deceleration mechanism is disposed between one end of the rotation shaft of the motor and the other end of the rotation shaft of the motor in a direction of the output shaft.

According to another aspect of the present invention, in the reaction force generating apparatus, the rotation member is rotatable with respect to the transmission member, and the rotation member is provided with a torque limiter which limits a torque to be transmitted between the rotation member and the transmission member to an upper limit value or less.

According to another aspect of the present invention, in the reaction force generating apparatus, in a direction along the rotation shaft of the motor, at least one portion in the layout range of the torque limiter and at least one portion of the layout range of the motor are overlapped with each other.

According to another aspect of the present invention, in the reaction force generating apparatus, the torque limiter has a torsion coil spring which is press-fitted and fixed to the outer peripheral surface of the transmission member and rotates together with the rotation member, and when the torque of the rotation member is equal to or smaller than the upper limit value corresponding to a frictional force between the torsion coil spring and the transmission member, the torque limiter transmits the torque of the rotation member to the transmission member, and when the torque of the rotation member exceeds the upper limit value, the torsion coil spring slips with respect to the transmission member, so that the torque of the rotation member is not transmitted to the transmission member.

According to another aspect of the present invention, the torque limiter has: a load receiving portion fixed to the transmission member; and an elastic member which presses the rotation member onto the load receiving portion in a direction along the rotation center line of the transmission member, when the torque of the rotation member is equal to or smaller than the upper limit value corresponding to a frictional force between the rotation member and the load receiving portion, the torque limiter transmits the torque of the rotation member to the transmission member, and when the torque of the rotation member exceeds the upper limit value, the rotation member slips with respect to the load receiving portion, so that the torque of the rotation member is not transmitted to the transmission member.

The reaction force generating apparatus according to the present invention makes it possible to suppress the size of the transmission member from becoming bulky in the radial direction.

According to the present invention, it becomes possible to realize a small-size reaction force generating apparatus having high freedom degree the layout designing at the time of a mounting process on a vehicle.

DETAILED DESCRIPTION

Hereinafter, embodiments of the present invention will be described in detail on the basis of the drawings.

First Embodiment

Figure 1:
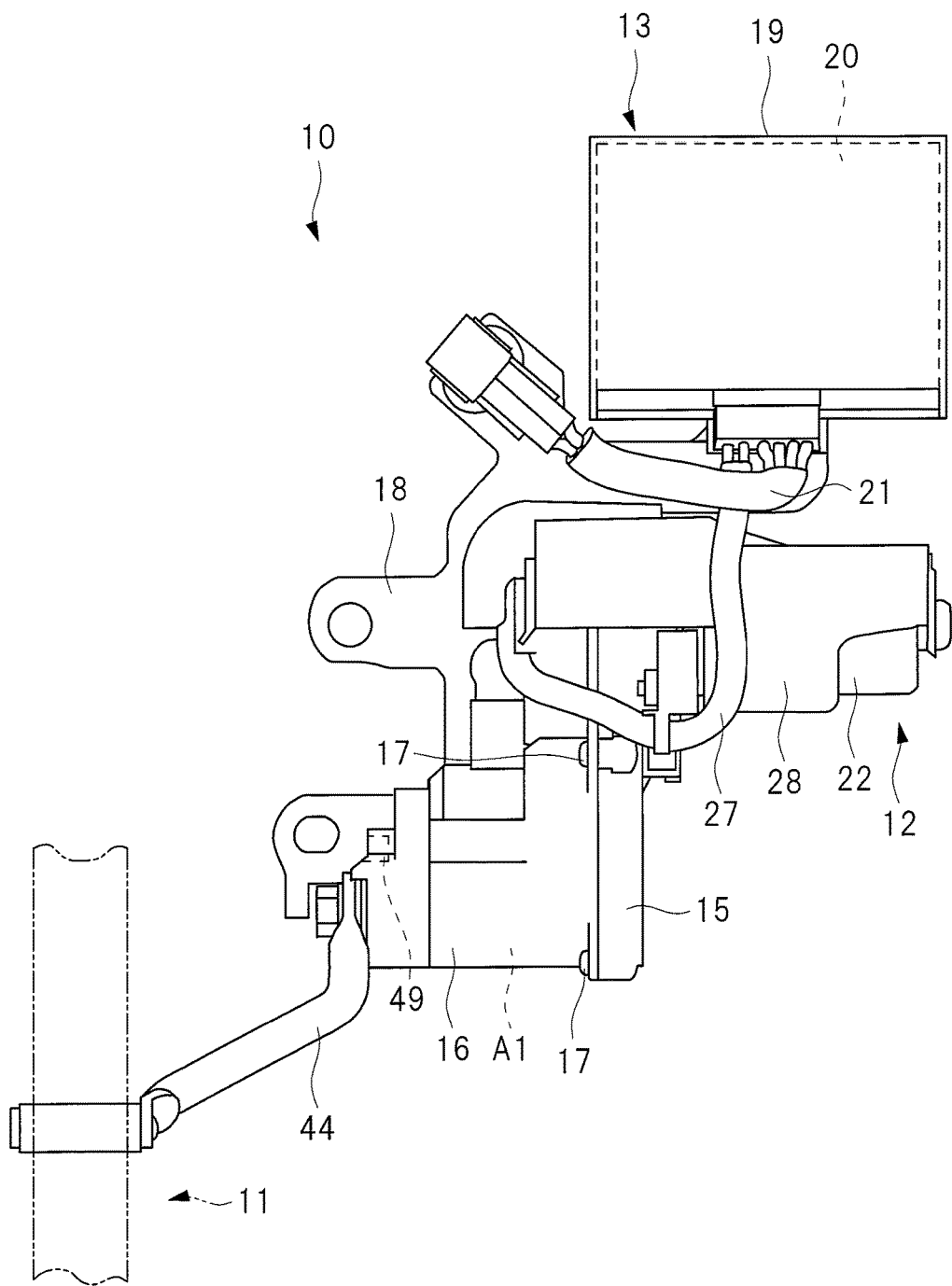
FIG. 1 is a front view showing an appearance of the first embodiment of a reaction force generating apparatus according to the present invention.
Figure 2:
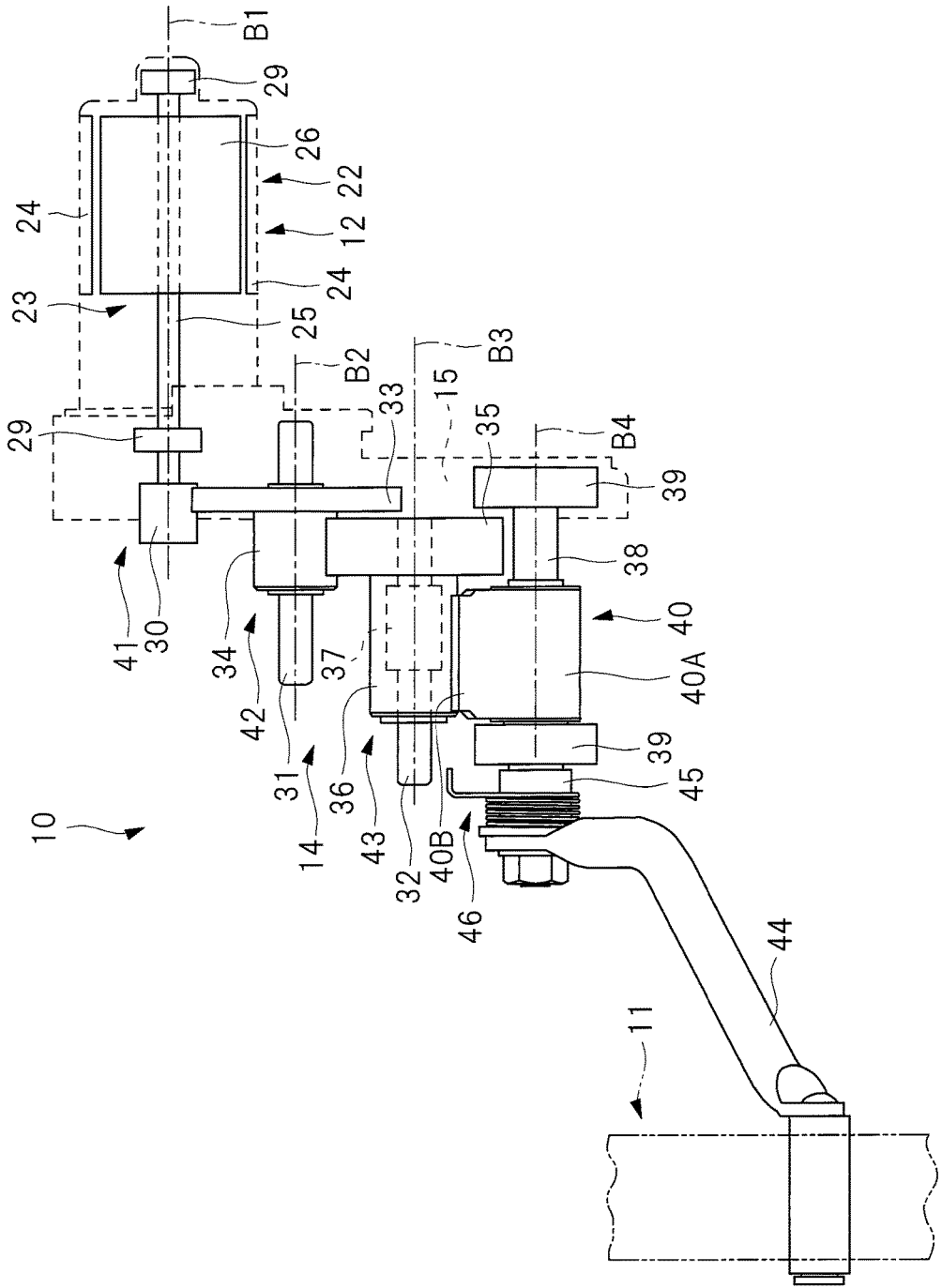
FIG. 2 is a front view showing an internal structure of the first embodiment of the reaction force generating apparatus according to the present invention.
Figure 3:
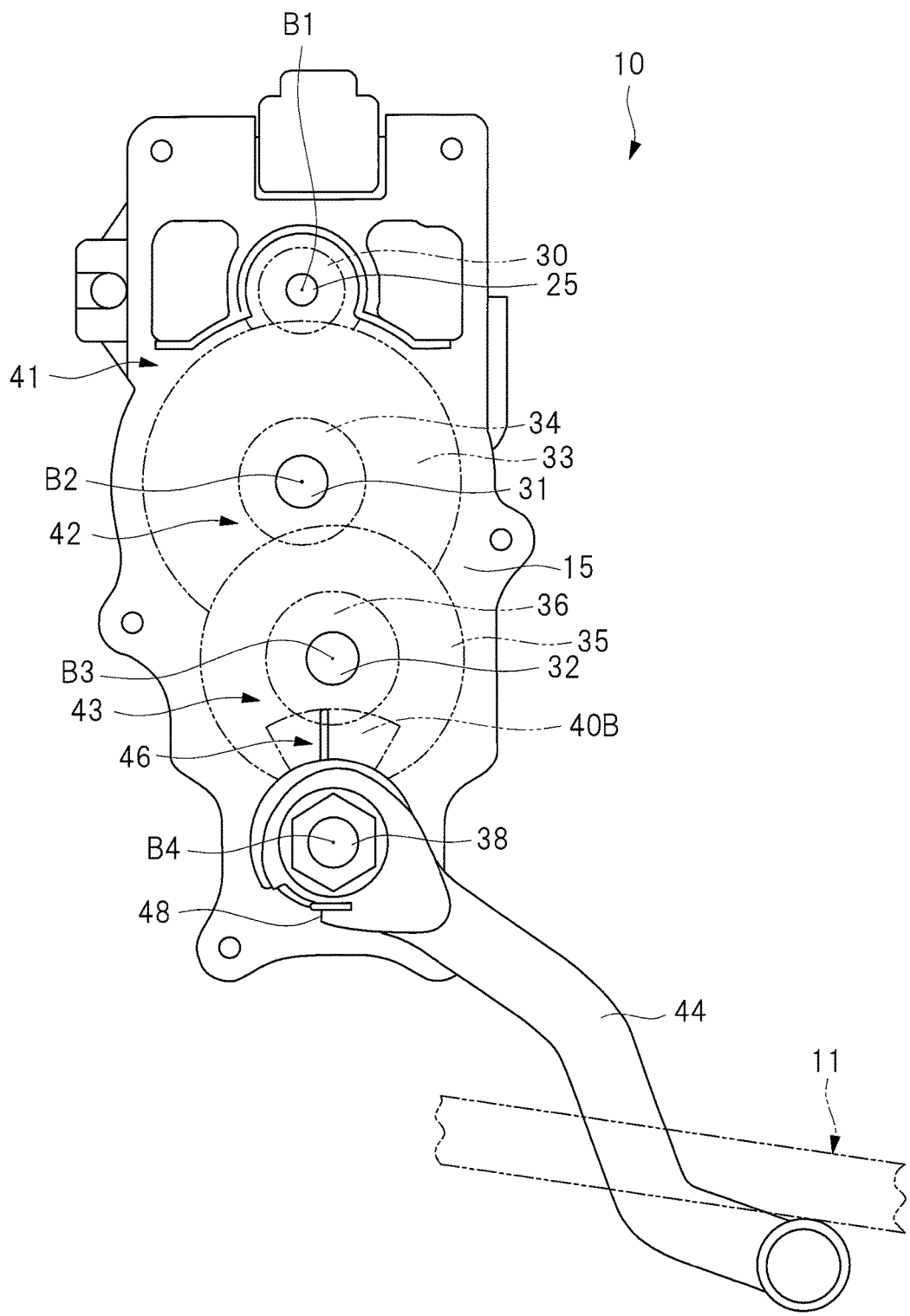
FIG. 3 is a side view of the reaction force generating apparatus shown in FIG. 2.

A reaction force generating apparatus 10 shown in FIGS. 1 to 3 is installed in a vehicle. The vehicle has a motor. The motor includes an engine and an electric motor. The vehicle has an accelerator pedal 11 serving as an operation member for controlling an output of the motor. The accelerator pedal 11 is rotatable with respect to a support shaft. The accelerator pedal 11 is allowed to be movable within an angular range. The accelerator pedal 11 is not allowed to make one revolution, that is, it is not allowed to be rotated by 360 degrees with respect to the support shaft, and the angular range of the accelerator pedal 11 is limited to, for example, 30 degrees or less.

A driver operates the accelerator pedal 11 by stepping it on by his/her foot. A return spring for the accelerator pedal is attached to the accelerator pedal 11 and adapted to maintain the accelerator pedal 11 at an initial position. The return spring for the accelerator pedal is not shown in the drawings. Furthermore, a sensor for detecting a rotation angle and a rotation speed of the accelerator pedal 11 is installed. A first controller to which a sensor signal is inputted is installed, and the first controller controls the output of the motor.

When the driver applies a stepping-on force, that is, a load, to the accelerator pedal 11, the accelerator pedal 11 rotates in a first direction against an elastic force of the return spring for the accelerator pedal. The output of the motor is controlled in accordance with the rotation angle from the initial position of the accelerator pedal 11 and the rotation speed of the accelerator pedal 11. When the stepping-on force applied to the accelerator pedal 11 is released from it, the accelerator pedal 11 is rotated in a second direction by the elastic force of the return spring for the accelerator pedal, and stopped at the initial position.

When a stepping-on force is applied to the accelerator pedal 11, the reaction force generating apparatus 10 applies a reaction force against the stepping-on force to the accelerator pedal 11. The reaction force generating apparatus 10 is provided with: an electric motor 12 for generating a torque serving as a reaction force; a second controller 13 for controlling the electric motor 12; and a transmission passage 14 for transmitting the reaction force generated by the electric motor 12 to the accelerator pedal 11. The reaction force generating apparatus 10 is provided with a gear cover 15 and a frame 16, and the gear cover 15 and the frame 16 form a housing space A1. The gear cover 15 is made of resin, and the frame 16 is made of metal. The transmission passage 14 is formed in the housing space A1.

Furthermore, a fixing element 17 for fixing the frame 16 and the gear cover 15 is installed in it. The fixing element 17 is a screw member. A bracket 18 to which the frame 16 is fixed is installed in it. The bracket 18 is fixed to the vehicle body, and the second controller 13 is provided with: a case 19; and a control board 20 housed inside the case 19. The control board 20 is connected to the first controller through a first harness 21.

The electric motor 12 is a motor for applying a reaction force to the accelerator pedal 11, and in this embodiment, an electric motor with brushes is used as the electric motor 12. The electric motor 12 has a yoke 22 and an armature 23. The yoke 22 has a cylindrical shape, and a permanent magnet 24 is fixed to an inner surface of the yoke 22.

The armature 23 has: a motor shaft 25; an armature core 26 attached to the motor shaft 25; and a coil wound around the armature core 26. The motor shaft 25 is rotatably supported by two bearings 29, and rotatable with respect to a center line B1. Furthermore, a brush holder is installed in the yoke 22, and the brush holder supports the brushes for electrification. A commutator is attached to the motor shaft 25, and the brushes for electrification are disposed in contact with the commutator. The coil is connected to the commutator. The brush holder is provided with terminals connected to the brushes for electrification. The terminals are connected to the control board 20 through a second harness 27. Furthermore, a motor cover 28 for covering the yoke 22, the gear cover 15 and the frame 16 is installed in it.

The transmission passage 14 is constituted in the following manner. A pinion gear 30 is attached to the motor shaft 25. In the housing space A1, a support shaft 31 and a support shaft 32 are installed in it. The support shaft 31 and the support shaft 32 are disposed in parallel with the motor shaft 25. In a direction for transmitting the reaction force of the electric motor 12 to the arm 44, the support shaft 31 is disposed on the downstream side from the motor shaft 25, and the support shaft 32 is disposed on the downstream side from the support shaft 31. The motor shaft 25, the support shaft 31 and the support shaft 32 are disposed in series in the direction for transmitting the reaction force of the electric motor 12 to the arm 44.

The support shaft 31 is supported by the frame 16 and the gear cover 15. A gear 33 and a gear 34 are attached to the support shaft 31. The gear 33 is integrally rotated together with the gear 34. The gear 33 is mashed with the pinion gear 30. The outer diameter of the gear 33 is larger than the outer diameter of the pinion gear 30. The outer diameter of the gear 34 is smaller than the outer diameter of the gear 33.

The support shaft 31 may have either a structure to be fixed to the frame 16 and the gear cover 15, or a structure to be rotatable with respect to them. In the case of the structure in which the support shaft 31 is fixed to the frame 16 and the gear cover 15, the gear 33 and the gear 34 are rotatably attached to the support shaft 31. Under the condition that the support shaft 31 is rotatable with respect to the frame 16 and the gear cover 15, the gear 33 and the gear 34 may have either a structure in which they are fixed to the support shaft 31, or a structure in which they are rotatable. The gear 33 and the gear 34 are rotatable with respect to a center line B2.

The support shaft 32 is supported by the frame 16 and the gear cover 15, and rotatable with respect to a center line B3. A gear 35 and a gear 36 are attached to the support shaft 32. The gear 35 is fixed to the support shaft 32, and the gear 35 is integrally rotatable together with the support shaft 32. In a direction for transmitting the torque of the electric motor 12 to the arm 44, the gear 36 is disposed on the downstream side from the support shaft 32. The gear 35 is meshed with the gear 34. The outer diameter of the gear 36 is smaller than the outer diameter of the gear 35, and the gear 36 is rotatable with respect to the support shaft 32 and the gear 35. The gear 35 and the gear 36 are provided as members different from each other. A one-way clutch 37 is interpolated between the gear 36 and the support shaft 32. Each of the gear 33 to gear 36 has a disc shape.

When a torque for urging the gear 36 in a clock-wise direction of the support shaft 32 is applied to it as shown in FIG. 3, the one-way clutch 37 is brought to an engaged state, that is, a "connected state". When the one-way clutch 37 is brought to the connected state, a force transmitting process is carried out between the gear 36 and the support shaft 32. When a torque for urging the gear 36 in a counterclockwise direction of the support shaft 32 is applied to it, the one-way clutch 37 is brought to a released state, that is, a "blocked state". When the one-way clutch 37 is brought to the blocked state, no force transmitting process is carried out between the gear 36 and the support shaft 32.

An output shaft 38 is housed in the housing space A1. The output shaft 38 is supported by the frame 16 and the gear cover 15, and rotatable with respect to a center line B4 through two bearings 39. In a direction for transmitting the torque of the electric motor 12 to the arm 44, the output shaft 38 is disposed on the downstream side from the support shaft 32. A sector gear 40 is installed on the output shaft 38. The sector gear 40 is disposed on the downstream side from the gear 36 in the direction for transmitting the torque of the electric motor 12 to the arm 44. That is, the sector gear 40 is disposed between the gear 36 and the arm 44 in the transmission passage of the torque. The sector gear 40 is provided with: a cylindrical portion 40A fixed to the output shaft 38; and an engaging portion 40B which protrudes outward in the radial direction from the outer peripheral face of the cylindrical portion 40A.

The engaging portion 40B is formed within a range of a fixed angle in a rotation direction with respect to the center line B4 in FIG. 3, and the sector gear 40 is engaged with the gear 36, and coupled to the gear 36, and capable of transmitting power. The sector gear 40 does not have a disc shape like the gear 33 to gear 36. An angle at which the engaging portion 40B is disposed corresponds to an angle at which the engaging portion 40B does not come off from the gear 36 when the accelerator pedal 11 rotates. The layout angle of the engaging portion 40B in the rotation direction is set to an angle less than 180 degrees, more specifically, to an angle which is larger than the rotation angle of the accelerator pedal 11, and is 90 degrees or less.

The pinion gear 30 and the gear 33 correspond to a first deceleration section 41, the gear 34 and the gear 35 correspond to a second deceleration section 42, and the gear 36 and the sector gear 40 correspond to a third deceleration section 43. When the torque of the electric motor 12 is transmitted to the output shaft 38, the rotation speed of the gear 33 becomes low relative to the rotation speed of the pinion gear 30, the rotation speed of the gear 35 becomes slow relative to the rotation speed of the gear 34 and the rotation speed of the sector gear 40 becomes slow relative to the rotation speed of the gear 36. That is, the torque is amplified in each of the first deceleration section 41, the second deceleration section 42 and the third deceleration section 43.

The transmission passage 14 includes the first deceleration section 41, the second deceleration section 42, the third deceleration section 43, the support shaft 32, the one-way clutch 37, the sector gear 40 and the output shaft 38. The arm 44 is fixed to the output shaft 38. The arm 44 is integrally rotated together with the output shaft 38. The output shaft 38 is inserted into a collar 45 having a cylindrical shape, and a return spring 46 for the reaction force generating apparatus is attached to the collar 45. The return spring 46 for the reaction force generating apparatus is a torsion coil spring. An engaging portion 48 is formed on the arm 44, and an engaging portion 49 is formed on the frame 16. The first end portion of the return spring 46 for the reaction force generating apparatus is passed over the engaging portion 48, and the second end portion of the return spring 46 for the reaction force generating apparatus is passed over the engaging portion 49. The return spring 46 for the reaction force generating apparatus urges the arm 44 counterclockwise in FIG. 3.

In FIG. 3 which is a plan view perpendicular to the center lines B1, B2, B3 and B4, the support shaft 31 and the support shaft 32 are disposed between the motor shaft 25 and the output shaft 38. The support shaft 31 is disposed between the motor shaft 25 and the support shaft 32. Furthermore, the engaging portion 40B is disposed between the output shaft 38 and the support shaft 32.

The reaction force generating apparatus 10 applies a reaction force to the accelerator pedal 11, as will be described below. When the accelerator pedal 11 is stopped at the initial position, that is, when the accelerator pedal 11 does not receive a stepping-on force, the electric motor 12 does not generate a torque. Upon receipt of the stepping-on force, the accelerator pedal 11 rotates in a first direction against the elastic force of the return spring for the accelerator pedal. The rotation angle of the accelerator pedal 11 is set to, for example, 30 degrees or less. The load received by the accelerator pedal 11 is transmitted to the arm 44. Upon receipt of the load, the arm 44 rotates clockwise with respect to the output shaft 38 shown in FIG. 3. The rotation angle of the arm 44 is set to a value corresponding to the rotation angle of the accelerator pedal 11. The arm 44 rotates against the elastic force of the return spring 46 for the reaction force generating apparatus.

The output shaft 38 and the sector gear 40 rotate clockwise together with the arm 44 in FIG. 3, and the torque of the sector gear 40 is transmitted to the gear 36. When the gear 36 receives a torque in the counterclockwise direction in FIG. 3, the one-way clutch 37 is brought to a connected state so that the torque of the gear 36 is transmitted to the support shaft 32 and the gear 35. The torque of the gear 35 is transmitted to the pinion gear 30 by way of the gear 34 and gear 33.

The first controller detects the rotation angle and rotation speed of the accelerator pedal 11, and a signal indicating the detection results is sent from the first controller to the second controller 13. The second controller 13 finds a target output of the electric motor 12 in accordance with the rotation angle and rotation speed of the accelerator pedal 11, and in accordance with the target output, controls a voltage to be applied to the coil.

When an electric current is formed in the coil, a rotational magnetic field is formed between the armature 23 and the yoke 22 in the electric motor 12 so that a torque is generated in the motor shaft 25. The direction of the torque generated in the motor shaft 25, that is, the reaction force, is clockwise in FIG. 3. The torque generated by the electric motor 12 is transmitted to the output shaft 38 through the first deceleration section 41, the second deceleration section 42 and the third deceleration section 43. The torque transmitted from the electric motor 12 to the output shaft 38 is transmitted to the accelerator pedal 11 through the arm 44. In this manner, the electric motor 12 generates a reaction force in accordance with the rotation angle and rotation speed of the accelerator pedal 11.

When the stepping-on force applied to the accelerator pedal 11 is released from it, the accelerator pedal 11 is returned to the initial position by the elastic force of the return spring for the accelerator pedal 11. When the stepping-on force applied to the accelerator pedal 11 is released from it, the arm 44 rotates counterclockwise in FIG. 3 to return to the initial position by the elastic force of the return spring 46 for the reaction force generating apparatus. During the rotation of the arm 44 in the counterclockwise direction in FIG. 3, the sector gear 40 rotates counterclockwise in FIG. 3 together with the arm 44 and returns to the initial position. When the sector gear 40 rotates counterclockwise, the gear 36 rotates clockwise in FIG. 3 to return to the initial position. When the gear 36 rotates clockwise in FIG. 3, the one-way clutch 37 is brought to the blocked state. For this reason, the torque of the gear 36 is not transmitted to the support shaft 32. Furthermore, when the stepping-on force applied to the accelerator pedal 11 is released from it, the second controller 13 stops the supply of the electric current to the electric motor 12. In other words, no torque is generated by the electric motor 12.

In the radial direction of the output shaft 38, the layout space of the sector gear 40 to be attached to the output shaft 38 is narrower than the layout space in the case of attaching the gear with a disc shape. That is, the layout space of the sector gear 40 downward from the output shaft 38 in FIG. 2 is narrower than the layout space of the gear having a disc shape downward from the output shaft 38. This is because the engaging portion 40B is disposed between the output shaft 38 and the support gear 32. Therefore, layout characteristic for attaching the reaction force generating apparatus 10 to a vehicle body is improved.

Furthermore, inertia required for rotating the sector gear 40 becomes smaller than inertia required for rotating the gear having the disc shape so that the responsiveness in applying the reaction force to the accelerator pedal 11 is improved. Furthermore, the layout angle of the sector gear 40 around the center line B4 can be set to the minimum angle as long as the angle does not make the sector gear 40 come off from the gear 36 when the accelerator pedal 11 rotates. That is, there is no need to dispose the engaging portion 40B of the sector gear 40 along the 360 degrees. Therefore, the reaction force generating apparatus 10 can be reduced in weight.

The correspondence relationship between the configuration in the embodiments and the configuration in the present invention will be described will be described as follows: The arm 44 corresponds to the rotation member in the present invention, the electric motor 12 corresponds to the motor in the present invention, the support shaft 32 corresponds to the support member and the support shaft in the present invention, the gear 36 corresponds to the first gear in the present invention, the sector gear 40 corresponds to the second gear and the sector gear in the present invention, the output shaft 38 corresponds to the transmission member in the present invention, the one-way clutch 37 corresponds to the one-way clutch in the present invention, and the return spring 46 for the reaction force generating apparatus corresponds to the rotation mechanism in the present invention.

The motor shaft 25 corresponds to the rotation shaft in the present invention, the cylindrical portion 40A corresponds to the cylindrical portion in the present invention, the engaging portion 40B corresponds to the engaging portion in the present invention, and the accelerator pedal 11 corresponds to the accelerator pedal in the present invention. The counterclockwise rotation of the gear 36 in FIG. 3 corresponds to "the rotation in the first direction" in the present invention, and the clockwise rotation of the gear 36 in FIG. 3 corresponds to "the rotation in the second direction" in the present invention. Additionally, when the reaction force generating apparatus 10 of FIG. 2 is seen in a right side view, the clockwise rotation corresponds to the rotation in the first direction, and the counterclockwise rotation corresponds to the rotation in the second direction.

The present invention is not intended to be limited by the above-mentioned embodiments, and it is needless to say that various modifications may be made within a scope not departing from the gist of the invention. For example, the control for transmitting the torque of the motor to the arm so as to apply a reaction force to the accelerator pedal includes, in addition to the first control for supplying an electric current to the electric motor so as to generate a power running torque, a second control for allowing the electric motor to function as a power generator. The second control allows the electric motor to generate a regenerative torque and to apply the regenerative torque to the arm. In the case of carrying out the second control, the second controller controls the regenerative torque generated by the electric motor in accordance with the rotation angle and rotation speed of the accelerator pedal.

Furthermore, in addition to the electric motor, the motor in the present invention includes a hydraulic motor and a pneumatic motor. Furthermore, in place of the gap between the support shaft 32 and the gear 36, the one-way clutch may be interpolated in the gap between the support shaft 31 and the gear 34. In this case, the frame 16 and the gear cover 15 rotatably support the support shaft 31. Furthermore, the gear 33 integrally rotates together with the support shaft 31, and the gear 34 is installed so as to rotate relative to the support shaft 31 and the gear 33. Then, the gear 35 and the gear 36 are made to be integrally rotated.

Furthermore, the one-way clutch may be interpolated between the motor shaft 25 and the pinion gear 30. In this case, the gear 33 and the gear 34 are configured to be integrally rotated, and the gear 35 and the gear 36 are configured to be integrally rotated. The motor shaft 25, the support shaft 31 and the support shaft 32 correspond to a plurality of support shafts in the present invention. The gear 34 and the pinion gear 30 correspond to the first gear in the present invention. Furthermore, the number of the deceleration sections is not limited by "3", and may be set to "1" or "2", or "4" or more. Furthermore, in addition to the accelerator pedal operated by his/her foot, the operation member for applying a load to the arm 44 may be prepared as a lever to be operated by a hand.

Second Embodiment

A reaction force generating apparatus according to the second embodiment is mounted on a vehicle which travels by using either one of an engine and an electric motor or both of them as a power source. The reaction force generating apparatus mounted on the vehicle applies a reaction force to the accelerator pedal operated by the driver of the vehicle, if necessary, in order to control the output of the power source. In the following explanation, the reaction force generating apparatus according to the present invention is referred to as "actuator 100".

Figure 4:
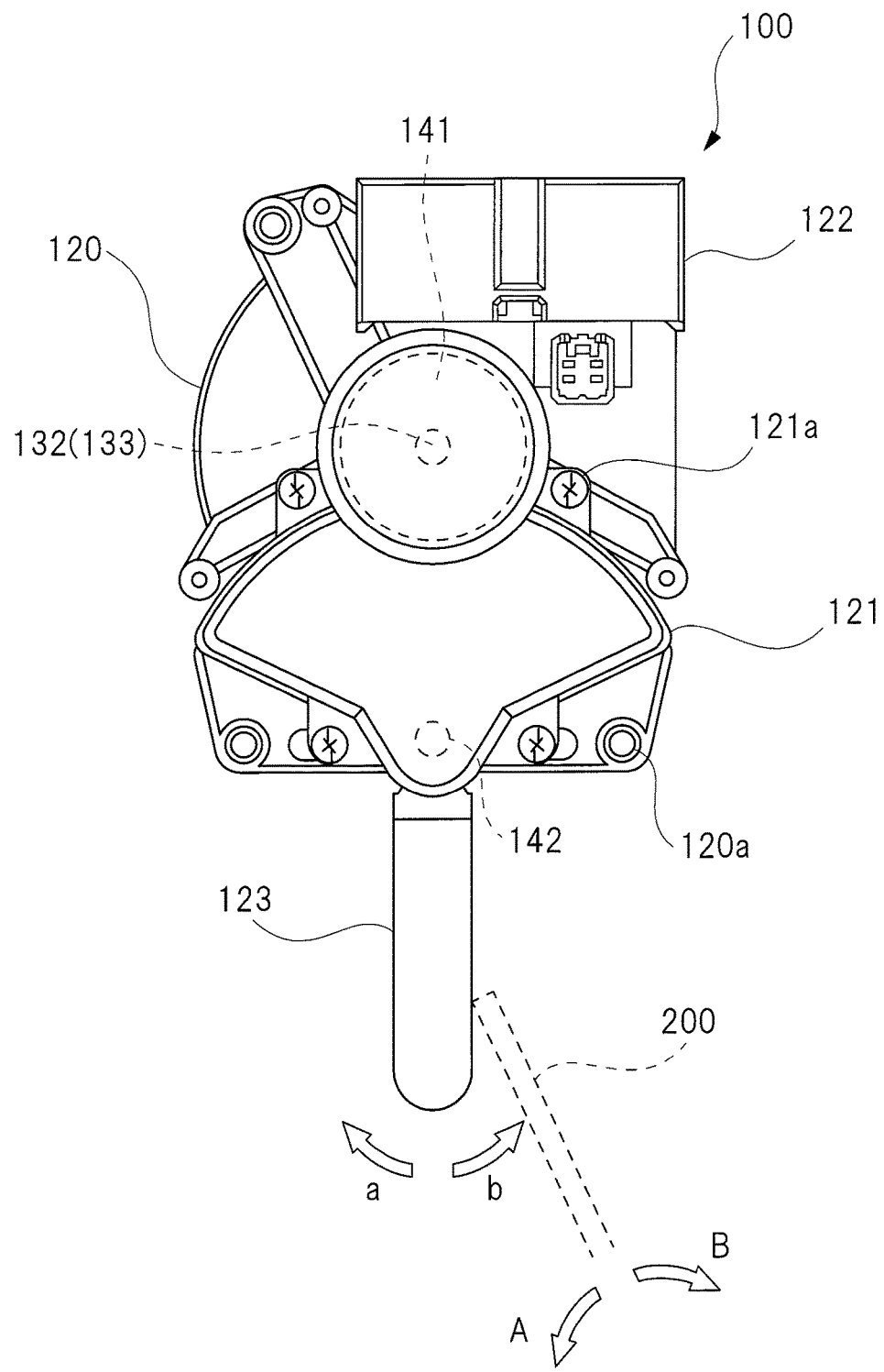
FIG. 4 is a front view showing the second embodiment of a reaction force generating apparatus according to the present invention.

An accelerator pedal 200 to which a reaction force is applied by the actuator 100 shown in FIG. 4 is supported by a support shaft (not shown) so as to rotate in a predetermined angle range. More specifically, the accelerator pedal 200 is held at the initial position by being urged by a return spring 110 (FIG. 6), and is also rotatable against the urging force within a range of about 30 degrees from the initial position. The return spring 110 corresponds to the rotation mechanism.

Figure 6:
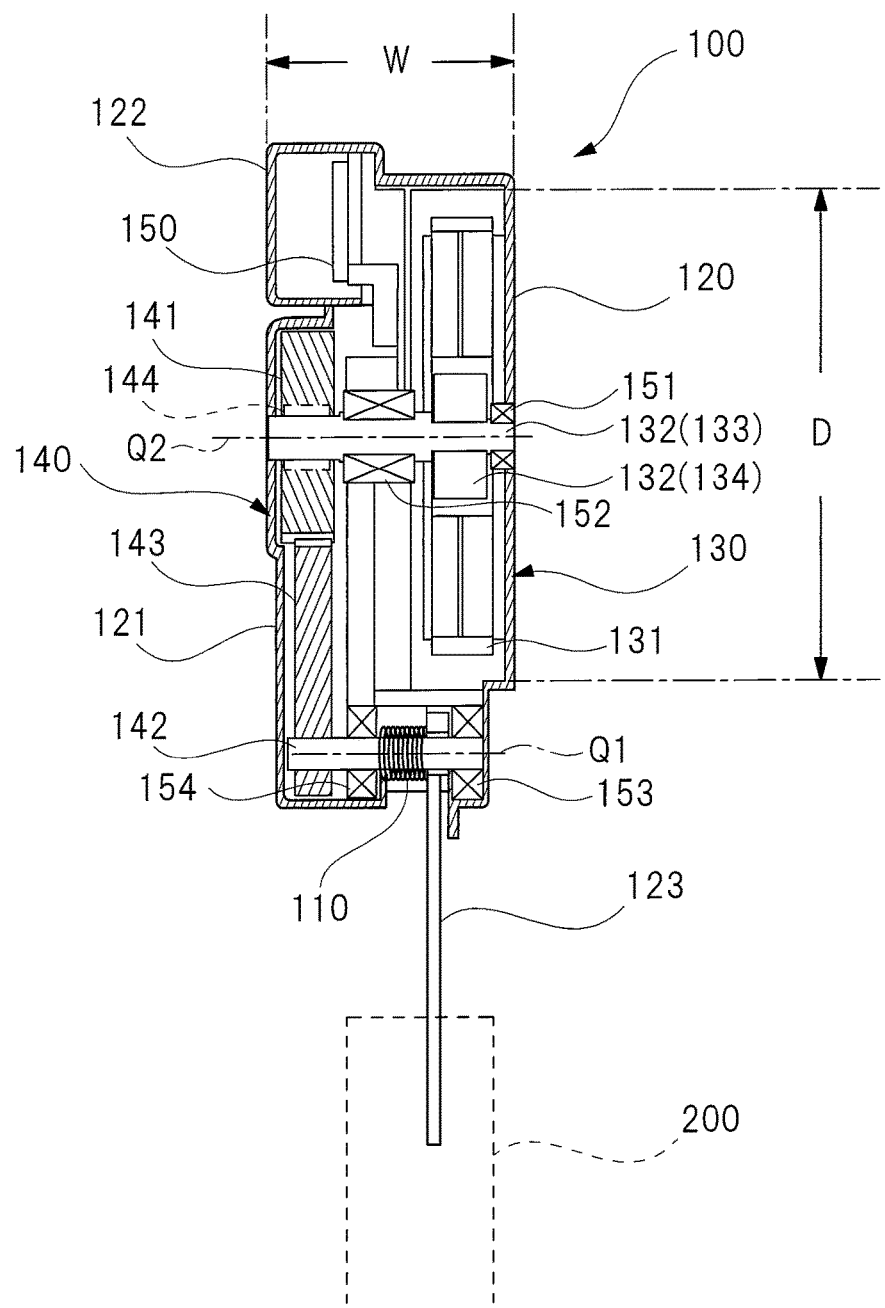
FIG. 6 is a cross-sectional view showing the reaction force generating apparatus shown in FIG. 4.

When the accelerator pedal 200 is stepped on by the driver, that is, when a load (stepping-on force) is applied to the accelerator pedal 200, the accelerator pedal 200 pivots in a first direction (in an arrow "A" direction in FIG. 4) against the urging force of the return spring 110 (FIG. 6). When the accelerator pedal 200 pivots in the first direction, the output of the vehicle power source increases in accordance with the pivotal angle and pivotal speed. On the other hand, when the driver releases the load application to the accelerator pedal 200, the accelerator pedal 200 pivots in a second direction (arrow "B" direction in FIG. 4) which is opposite to the first direction by the urging force of the return spring 110 (FIG. 6) to return to the initial position. Then, along with the pivotal movement in the second direction of the accelerator pedal 200, the output of the vehicle power source is reduced. In the following description, the first direction (arrow "A" direction) shown in FIG. 4 may be sometimes referred to as "pushing side", and the second direction (arrow "B" direction) may be sometimes referred to as "return side".

The actuator 100 applies a predetermined reaction force, if necessary, to the accelerator pedal 200 operated as described above. More specifically, when the accelerator pedal 200 is pivoted toward the pushing side, it gives a torque (reaction force) for allowing the accelerator pedal 200 to pivot toward the return side to the accelerator pedal 200. Thus, it becomes possible, for example, to avoid excessive stepping-on operations of the accelerator pedal 200 and consequently to improve the fuel cost, or to avoid abrupt stepping-on operations of the accelerator pedal 200 and consequently to avoid sudden start or the like.

Figure 5:
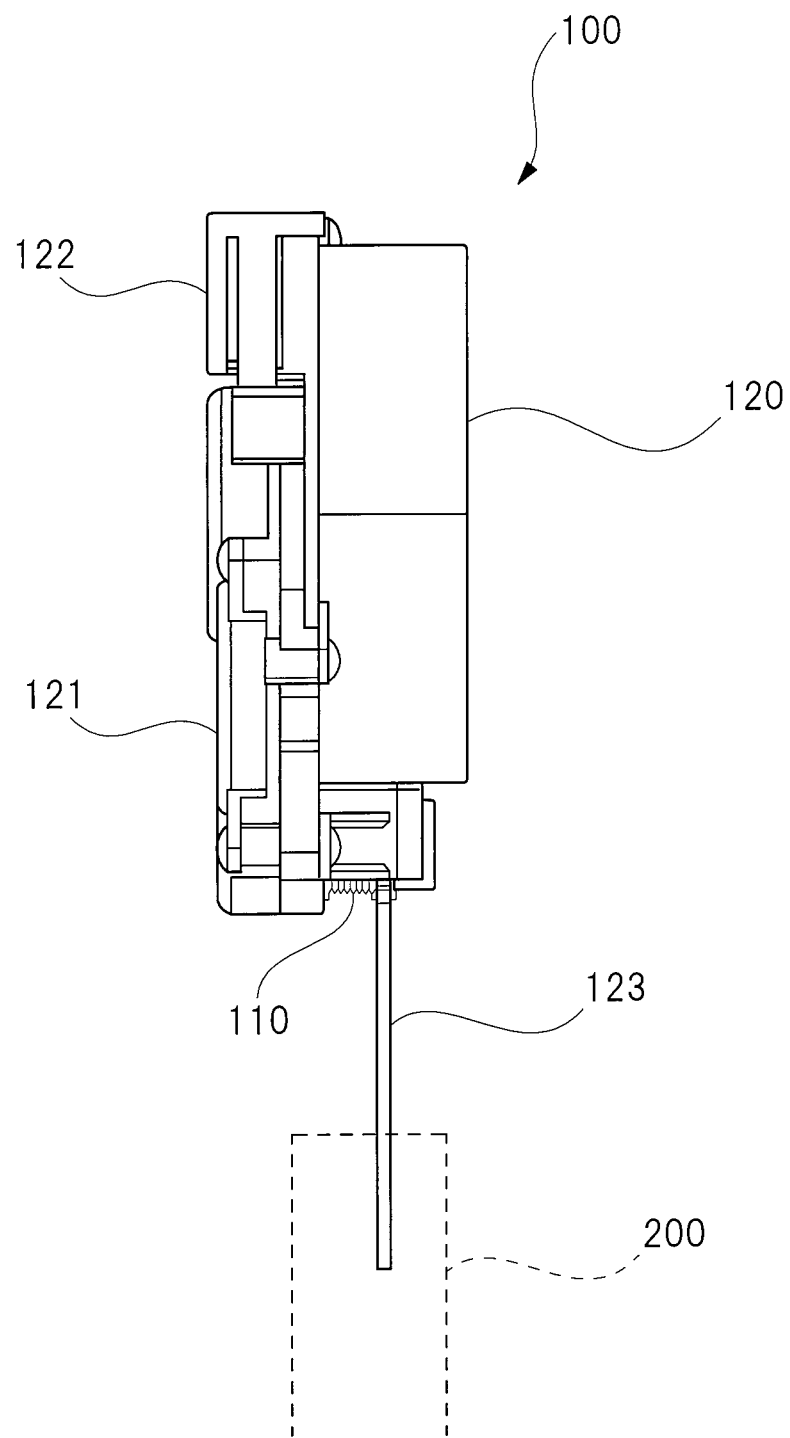
FIG. 5 is a side view showing the reaction force generating apparatus shown in FIG. 4.

Hereinafter, the structure of the actuator 100 will be described in detail. As shown in FIGS. 4 and 5, the actuator 100 is provided with: a motor case 120 made of resin; a gear case 121 made of resin; a circuit board cover 122 made of resin; and an arm 123 made of metal which extends downward from the gear case 121. The arm 123 corresponds to the rotation member.

As shown in FIG. 4, a plurality of bolt holes 120a through which bolts for fixing the actuator 100 onto the vehicle are inserted are formed on the motor case 120, and the gear case 121 is fixed to the front surface of the motor case 120 by a plurality of bolts 121a. Furthermore, the circuit board cover 122 is attached to the upper portion of the front surface of the motor case 120. That is, the motor case 120, the gear case 121 and the circuit board cover 122 are integrally formed.

As shown in FIG. 6, a motor 130 is housed in the motor case 120, and a deceleration mechanism 140 for decelerating the rotation of the motor 130 is housed in the gear case 121. Furthermore, in front of the motor 130 and above the deceleration mechanism 140, a control board 150 for controlling the motor 130 is disposed, and the control board 150 is covered with the circuit board cover 122. Furthermore, as shown in FIG. 4, the side face of the arm 123 protruding downward from the gear case 121 abuts on the upper end of the accelerator pedal 200, and the output of the deceleration mechanism 140 (FIG. 6) is transmitted to the accelerator pedal 200 through the arm 123.

Referring again to FIG. 6, the motor 130 is an electric motor with brushes which has a yoke 131 and an armature 132. The yoke 131 has a cylindrical shape, and a permanent magnet is fixed to the inside of the yoke 131. The armature 132 is a support member.

The armature 132 is provided with: a motor shaft 133 serving as the rotation shaft of the motor 130; an armature core 134 attached to the motor shaft 133; and a coil wound around the armature core 134. The motor shaft 133 is rotatably supported by two roll bearings (ball bearings in the second embodiment) 151 and 152 with respect to a rotation center line Q2.

To the motor shaft 133, a commutator connected to the coil is attached, and the commutator is disposed in contact with brushes for electrification. The brushes for electrification are held by a bush holder installed on the inside of the yoke 131, and terminals connected to the brushes for electrification are installed on the brush holder.

A pinion gear 141 serving as a first spur gear is fixed to one end of the motor shaft 133 through a one-way clutch 144. The pinion gear 141 serves as a first gear. The pinion gear 141 functions as the output gear of the motor 130, as well as functioning as the input gear of the deceleration mechanism 140. The one-way clutch 144 is designed so that it is brought to an engaged state, that is, a "connected state", when the pinion gear 141 applies a torque for urging the motor shaft 133 in a clockwise direction, as shown in FIG. 4. When the one-way clutch 144 is brought to the connected state, a power transmission is carried out between the pinion gear 141 and the motor shaft 133. When the pinion gear 141 applies a torque for urging the motor shaft 133 in a counterclockwise direction as shown in FIG. 1, the one-way clutch 144 is brought to a released state, that is, a "blocked state". When the one-way clutch 144 is brought to the blocked state, no power transmission is carried out between the pinion gear 141 and the motor shaft 133.

Below the motor shaft 133, the driving shaft 142 serving as the output shaft of the deceleration mechanism 140 is disposed in parallel with the motor shaft 133. The driving shaft 142 is a transmission member. The driving shaft 142 is supported by two roll bearings (ball bearings in the second embodiment) 153 and 154, and rotatable with respect to a rotation center line Q1. To one end side of the driving shaft 142, a sector gear 143 serving as a second spur gear (second gear) is fixed, and to the other end side of the driving shaft 142, the upper end of the arm 123 is fixed. The sector gear 143, which is provided with a gear portion which is larger in diameter than that of the pinion gear (input gear) 141, and which is meshed with the pinion gear 141, functions as the output gear of the deceleration mechanism 140. That is, the deceleration mechanism 140 is a one-stage deceleration mechanism constituted by the pinion gear 141 serving as the input gear and the sector gear 143 serving as the output gear, and its deceleration ratio is 4.3:1.0.

In this case, the dimension in the direction of the motor shaft 133 of the motor 130 is smaller than the dimension in the radial direction. In the following description, the dimension in the direction of the motor shaft 133 may be sometimes referred to as "axial direction dimension (W)", and the dimension in the radial direction may be sometimes referred to as "radial direction dimension (D)". In other words, the motor 130 is a flat motor in which the axial direction dimension (W) is smaller than the radial direction dimension (D).

Furthermore, at least one portion of the sector gear 143 is disposed in the radial direction dimension (D) of the motor 130. More specifically, at least the gear portion of the sector gear 143 and the motor 130 are mutually overlapped with each other in the direction of the motor shaft 133. In other words, when the sector gear 143 is viewed in the motor shaft direction (from the left side of the drawing surface of FIG. 3), at least the gear portion of the sector gear 143 is projected onto the end face of the motor 130.

Furthermore, the axial direction dimension (W) is the same as or substantially the same as the length of the motor shaft 133, and the driving shaft 142 is disposed in the range of the length of the motor shaft 133 relative to the axial direction. That is, the driving shaft 142 and the arm 123 fixed to the driving shaft 142 are disposed between the one end and the other end of the motor shaft 133. In other words, the driving shaft 142 and the arm 123 fixed to the driving shaft 142 are disposed within the axial direction dimension (W) of the motor 130, and included within the thickness of the motor 130.

The actuator 100 having the above-mentioned structure applies a reaction force to the accelerator pedal 200 in the following manner under control by the control part (not shown) connected through a harness.

As shown in FIG. 4, when the accelerator pedal 200 is stopped at the initial position, that is, when the accelerator pedal 200 is not subjected to the stepping-on force, the motor 130 (FIG. 6) is not driven. Therefore, no torque is outputted from the motor 130 shown in FIG. 6, and applied to the accelerator pedal 200.

On the other hand, when the accelerator pedal 200 shown in FIG. 1 receives a stepping-on force and pivots toward the pressing side (arrow "A" direction) against the urging force of the return spring 110 (FIG. 4), the arm 123 pivots in an arrow "a" direction in FIG. 4 so that the driving shaft 142 rotates clockwise in FIG. 4. Furthermore, the pinion gear 141 rotates counterclockwise in FIG. 4, that is, in the first direction. During this time, the pivotal angle and the pivotal speed of the accelerator pedal 200 are detected by a sensor (not shown) and the detection signal indicating the detection result is inputted to the control part (not shown). The control part to which the detection signal has been inputted sets a target torque of the motor 130 shown in FIG. 6 based upon the detection signal, and applies an electric current in accordance with the set target torque to the motor 130 through the control board 150.

Upon receipt of a power supply, the motor 130 generates a torque by a rotational magnetic field generated between the yoke 131 and the armature 132. That is, the torque is outputted from the motor 130. The torque outputted from the motor 130 is transmitted to the accelerator pedal 200 through the deceleration mechanism 140. More specifically, the torque outputted from the motor 130 is transmitted to the arm 123 through the motor shaft 133, the pinion gear 141, the sector gear 143 and the driving shaft 142. The pinion gear 141 transmits the torque in the clockwise direction in FIG. 4, that is, in the second direction. Then, the arm 123 receives a torque exerted in an arrow "b" direction in FIG. 1. As a result, a torque (reaction force) toward the returning side (arrow "B" direction) is applied to the accelerator pedal 200 made in contact with the arm 123. At this time, the pinion gear 141 shown in FIG. 6 functions as an input gear of the deceleration mechanism 140 so that the sector gear 143 functions as the output gear of the acceleration mechanism 140. As described above, the reaction force against the stepping-on force is applied to the accelerator pedal 200 receiving the stepping-on force.

When the application of the stepping-on force to the accelerator pedal 200 is released from it, the accelerator pedal 200 returns to the initial position by the urging force of the return spring 110. More specifically, the driving shaft 142 rotates counterclockwise in FIG. 4 by the urging force of the return spring 110 shown in FIG. 6. Then, the arm 123 pivots in the arrow "b" direction in FIG. 4 so that the accelerator pedal 200 pivots in the arrow "B" direction in FIG. 4 to return to the initial position. As described earlier, the one-way clutch 144 is installed between the motor shaft 133 and the pinion gear 141, the torque of the driving shaft 142 rotating in the counterclockwise direction by the urging force of the return spring 110 is not transmitted to the motor side (FIG. 6).

When the accelerator pedal 200 returns to the initial position, or when the pivotal angle of the accelerator pedal 200 relative to the initial position becomes smaller than a predetermined angle, the control part (not shown) stops the energization to the motor 130 through the control board 150.

As described above, in the actuator 100 according to the present embodiment, since one portion of the sector gear 143 serving as the output gear of the deceleration mechanism 140 and the motor 130 are overlapped with each other in the radial direction of the motor 130, the actuator 100 can be reduced in size in the radial direction of the motor 130.

Furthermore, since the one-way clutch 144 is installed between the motor shaft 133 and the pinion gear 141, there is no need to dispose the engaging portion of the gear along all the 360 degrees. Therefore, the sector gear can be used as the output gear of the deceleration mechanism 140, and this structure makes it possible to reduce the size of the actuator 100 in the radial direction of the motor 130.

Furthermore, a flat motor in which the axial direction dimension (W) is smaller than the radial direction dimension (D) is used as the motor 130, the driving shaft 142 serving as the output shaft of the deceleration mechanism 140 and the arm 123 are disposed within the range of length of the motor shaft 133. Therefore, the actuator 100 is reduced in size in particular in the axial direction so that the freedom degree in layout at the time of a mounting process on a vehicle can be improved.

Furthermore, usually, the deceleration mechanism 140 installed in the actuator 100 according to the present embodiment is a small-size one-stage deceleration mechanism in comparison with a multistage deceleration mechanism, and this structure also reduce the size of the actuator 100.

In addition, the one-stage deceleration mechanism generally has a better deceleration efficiency in comparison with the multistage deceleration mechanism, and also has a smaller deceleration ratio. When the deceleration efficiency of the deceleration mechanism interpolated between the motor and the accelerator pedal is good, in comparison with a case where this is bad, a difference between the torque (=output torque of the deceleration mechanism) serving as a reaction force to be applied to the accelerator pedal and the output torque (=input torque of the deceleration mechanism) required for obtaining the above-mentioned torque becomes smaller. Therefore, the motor control for applying a desired reaction force to the accelerator pedal becomes easier so that an appropriate reaction force in accordance with a driving circumstance can be easily applied to the accelerator pedal.

Furthermore, in the present embodiment, since the motor shaft 133 and the driving shaft 142 are supported by roll bearings, these are less susceptible to friction in comparison with a case where these are supported by sliding bearings, and the deceleration efficiency is consequently improved.

Third Embodiment

Hereinafter, the third embodiment in which the actuator 100 of FIG. 6 is partially modified, will be described in detail with reference to FIG. 7, members the same as those of FIG. 6 are denoted by the same reference numerals as those of FIG. 6. A sector gear 143 shown in FIG. 7 has a structure in which a holding groove 160 is formed on the outside of the driving shaft 142, and the holding groove 160 has an annular shape, and the return spring 110 is disposed in the holding groove 160. In the direction of the rotation center line Q1 of the driving shaft 142, the return spring 110 is overlapped in layout with the sector gear 143.

Furthermore, the actuator 100 is provided with a torque limiter 161. The torque limiter 161 limits the torque to be transmitted from the arm 123 to the driving shaft 142. The torque limiter 161 is disposed between a bearing 153 and a bearing 154 in the direction of the rotation center line Q1.

The torque limiter 161 is provided with: a large diameter portion 162 forming one portion of the driving shaft 142; and a torsion coil spring 163 attached to the outer periphery of the large diameter portion 162. The outer diameter of the large diameter portion 162 is larger than the outer diameter of the other portion of the driving shaft 142. The torsion coil spring 163 is made of metal, and the torsion coil spring 163 is press-inserted onto the outer peripheral surface of the large diameter portion 162. The torsion coil spring 163 is coupled to the arm 123, and the arm 123 and the torsion coil spring 163 are integrally rotated with respect to the rotation center line Q1. The arm 123 has a shaft hole 123A, and the driving shaft 142 is disposed in the shaft hole 123A. The arm 1123 is rotatable with respect to the driving shaft 142.

Figure 7:
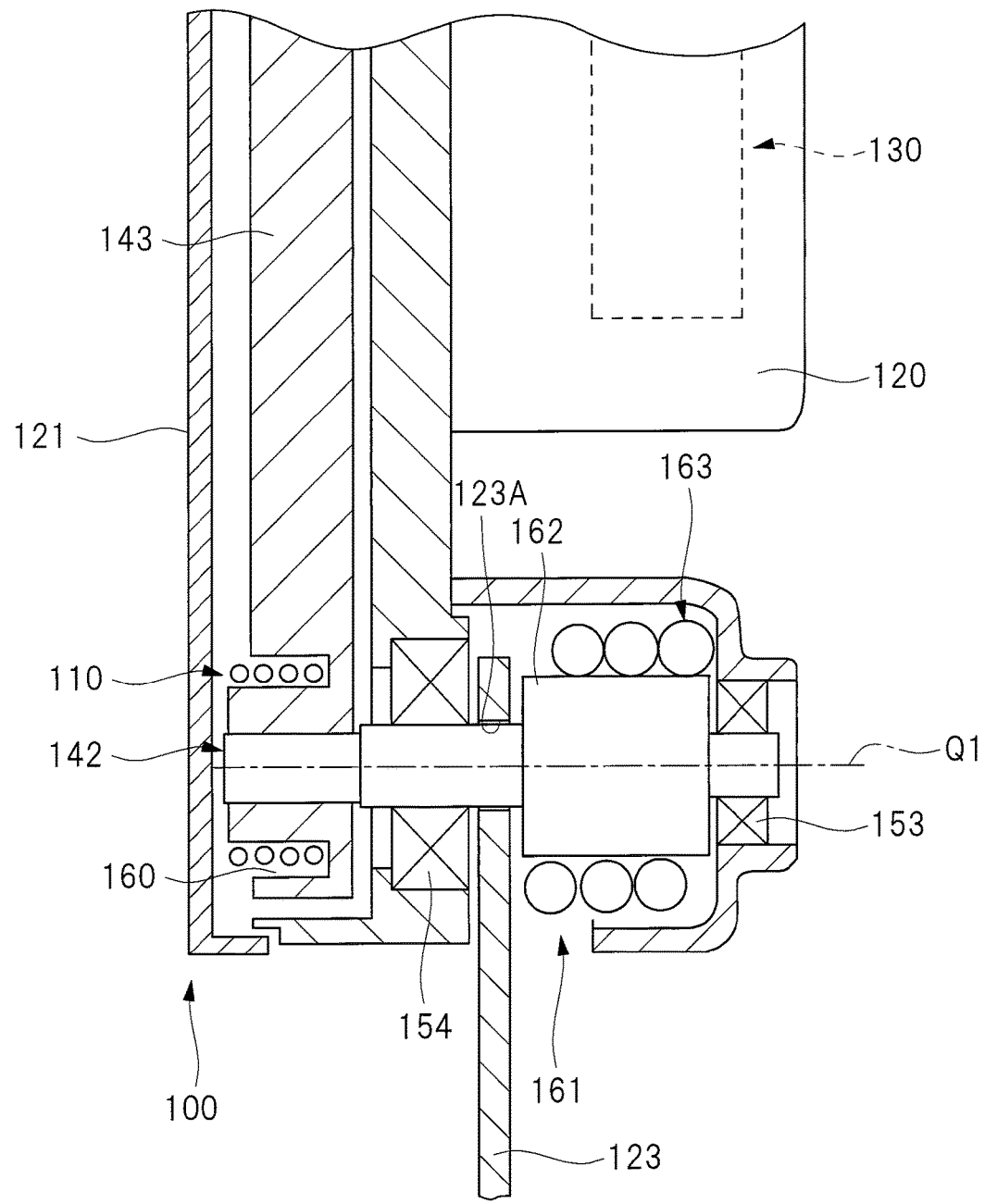
FIG. 7 is a partial cross-sectional view showing the third embodiment of a reaction force generating apparatus according to the present invention.

In the actuator 100 shown in FIG. 7, when the torque of the arm 123 is an upper limit value corresponding to a frictional force between the torsion coil spring 163 and the large diameter portion 162 or less, the torque of the arm 123 is transmitted to the driving shaft 142. When the torque of the arm 123 exceeds the upper limit value, the torsion coil spring 163 slides on the large diameter portion 162, the torque of the arm 123 is not transmitted to the driving shaft 142. For this reason, by designing the torque limiter 161 so as to provide a contact area between the torsion coil spring 163 and the large diameter portion 162 or a press-insertion margin, the upper limit value of the torque to be transmitted from the arm 123 to the driving shaft 142 can be adjusted.

Furthermore, in the direction of the rotation center line Q1 of the driving shaft 142, the layout range of the return spring 110 is overlapped with the layout range of the sector gear 143. Therefore, it is possible to prevent the actuator 100 from becoming bulky in the direction of the rotation center line Q1. Furthermore, in the direction of the rotation center line Q1 of the driving shaft 142, the layout range of the torque limiter 161 is overlapped with one portion of the layout range of the motor 130 in a direction of the rotation center line Q2 of the motor shaft 133 of the motor 130. Therefore, it is possible to prevent the actuator 100 from becoming bulky in the direction of the rotation center line Q2.

Fourth Embodiment

Figure 8:
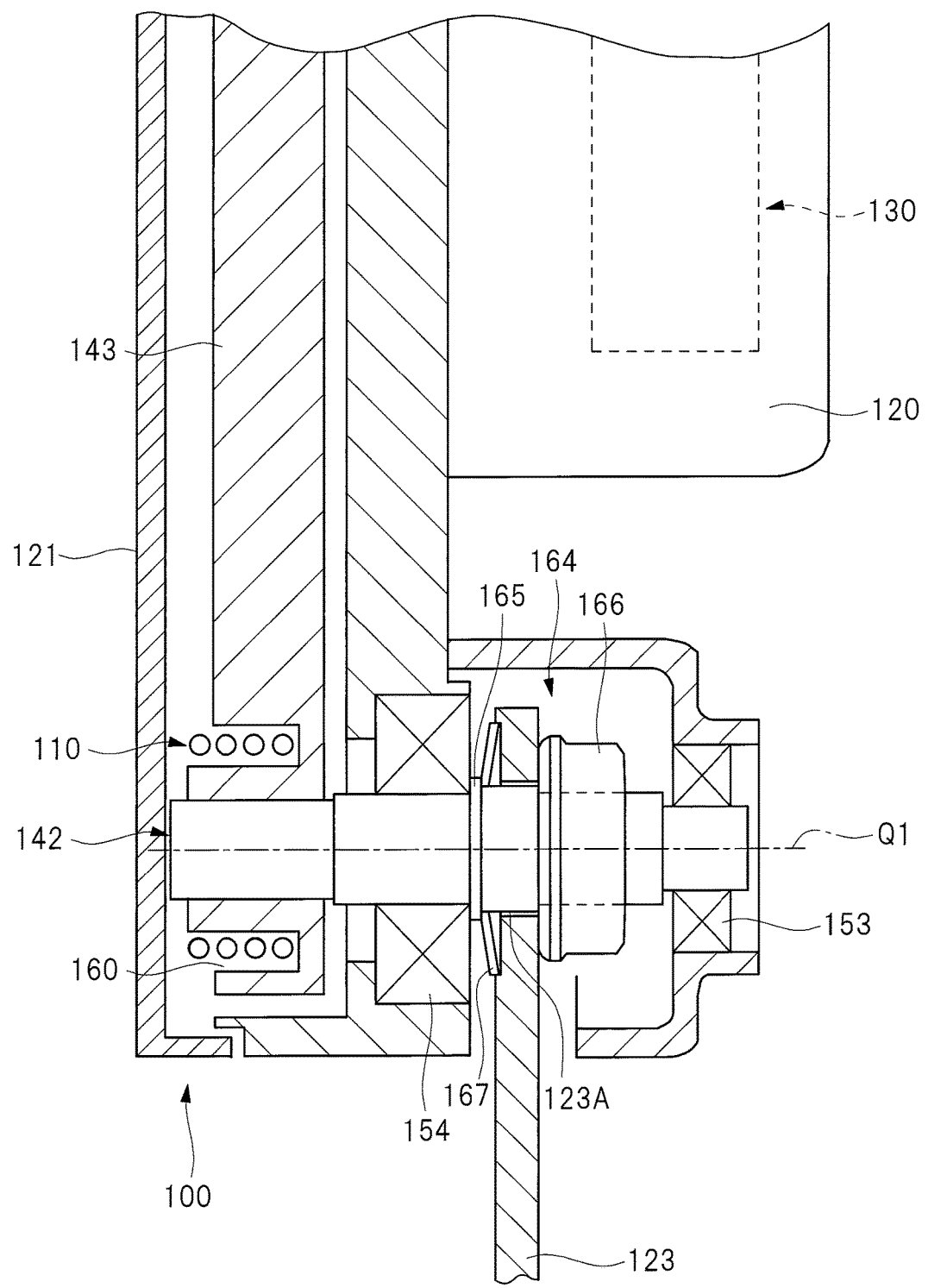
FIG. 8 is a partial cross-sectional view showing the fourth embodiment of a reaction force generating apparatus according to the present invention.

Hereinafter, a fourth embodiment in which the actuator 100 of FIG. 7 is partially modified will be described on the basis of FIG. 8. In FIG. 8, members the same as those of FIGS. 6 and 7 are indicated by the same reference numerals as those of FIGS. 6 and 7. The arm 123 has a shaft hole 123A, and the driving shaft 142 is disposed in the shaft hole 123A. The arm 1123 is rotatable with respect to the driving shaft 142. The sector gear 143 has a holding groove 160, and the return spring 110 is disposed in the holding groove 160.

Furthermore, the actuator 100 has a torque limiter 164. The torque limiter 164 is disposed between a bearing 153 and a bearing 154 in the direction of the rotation center line Q1. The torque limiter 164 limits a torque to be transmitted from the arm 123 to the driving shaft 142. The torque limiter 161 is provided with: a flange 165 attached to the outer peripheral surface of the driving shaft 142; a nut 166 fixed to the driving shaft 142; and an annular disc spring 167 disposed between the nut 166 and the flange 165 in the direction of the rotation center line Q1. The disc spring 167 is made of metal, and the arm 123 is disposed between the disc spring 167 and the nut 166 in the direction of the rotation center line Q1. The nut 166 is fixed to a female screw formed on the outer peripheral face of the driving shaft 142. The disc spring 167 is attached in a state compressed in the direction of the rotation center line Q1 so that the arm 123 is pressed onto the nut 166 by an elastic restoring force of the disc spring 167. The disc spring 167 presses the arm 123 onto the nut 166 in the direction of the rotation center line Q1. The nut 166 is a load receiving portion, and receives a load applied in the direction of the rotation center line Q1.

In the actuator 100 shown in FIG. 8, when the torque of the arm 123 is an upper limit value corresponding to a frictional force between the arm 123 and the nut 166 or less, the torque of the arm 123 is transmitted to the driving shaft 142. When the torque of the arm 123 exceeds the upper limit value, the arm 123 slips on the nut 166, the torque of the arm 123 is not transmitted to the driving shaft 142. For this reason, in the torque limiter 164, by designing the spring constant of the disc spring 167 or the contact area between the nut 166 and the arm 123, the upper limit value of the torque to be transmitted from the arm 123 to the driving shaft 142 can be adjusted.

Furthermore, in the direction of the rotation center line Q1 of the driving shaft 142, the layout range of the torque limiter 164 is overlapped with one portion of the layout range of the motor 130 in the direction of the rotation center line Q2 of the motor shaft 133 of the motor 130. Therefore, it is possible to prevent the actuator 100 from becoming bulky in the direction of the rotation center line Q2.

The present invention is not intended to be limited by the above-mentioned second and third embodiments, and it is needless to say that various modifications may be made within a scope not departing from the gist of the invention. For example, the motor 130 shown in FIG. 6 may be replaced by a brushless motor. Furthermore, the motor 130 is not limited only by the electric motor, and may be replaced by a hydraulic motor or a pneumatic motor.

The elastic member which presses the arm 123 onto the nut 166 is not limited only by the disc spring, and may be replaced by a compression coil spring. In addition to the nut 166 to be attached to the driving shaft 142, the load receiving portion may be prepared as an annular member which is welded and fixed to the driving shaft 142.

The reaction force generating apparatus includes two different configurations in a direction along the rotation center line of the motor. In one configuration, the layout range of the motor and the layout range of the torque limiter are partially overlapped with each other. In another configuration, the layout range of the motor and the layout range of the torque limiter are overlapped with each other on the entire portions.

The present invention is usable as a reaction force generating apparatus for applying a reaction force against a stepping-on force to an accelerator pedal which is installed in a vehicle and subjected to the stepping-on force.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A reaction force generating apparatus comprising: a rotation member which is rotated by a load;
   a motor which applies a reaction force in a direction opposite to a rotation direction of the rotation member to the rotation member;
   a rotation shaft which is rotatably installed in a transmission passage through which a reaction force generated by the motor is transmitted to the rotation member;
   a first gear which is rotatably attached to the rotation shaft;
   a second gear which is disposed on a downstream side of the transmission passage from the first gear, and coupled to the first gear;
   a transmission member which is rotatably installed in the transmission passage, and to which the second gear and the rotation member are attached;
   a control board which controls the motor;
   a one-way clutch which is interposed between the rotation shaft and the first gear in the transmission passage;
   a deceleration mechanism for decelerating a rotation to be transmitted to the rotation member from the motor, the deceleration mechanism being a one-stage deceleration mechanism having:
      the first gear serving as an input gear; and
      the second gear serving as an output gear;
   a motor case in which the motor is accommodated; and
   a gear case which is fixed to a front face of the motor case, wherein the one-way clutch has:
      a state in which, when a load is applied to the rotation member to rotate the first gear in a first direction, the one-way clutch connects the transmission passage to the rotation member; and
      a state in which, when the load applied to the rotation member is released from the rotation member to rotate the first gear in a second direction, the one-way clutch blocks the transmission passage, the second gear is a sector gear,
   the control board is disposed in front of the motor and above the deceleration mechanism, and covered with a circuit board cover,
   the rotation member protrudes downward from the gear case,
   the motor case, the gear case, the rotation member and the control board are disposed within a range of an axial dimension of the rotation shaft in the direction along the rotation shaft.

2. The reaction force generating apparatus according to claim 1, wherein
   an output shaft of the deceleration mechanism is disposed,
   the output shaft is rotatably supported by two ball bearings, and
   the rotation member and the second gear are provided to the output shaft.

3. The reaction force generating apparatus according to claim 1, wherein
   at least one portion of the output gear of the deceleration mechanism and at least one portion of the motor are overlapped with each other in the direction of the rotation shaft.

4. The reaction force generating apparatus according to claim 3, wherein
   the rotation member is disposed between one end of the rotation shaft and the other end of the rotation shaft in the direction of the rotation shaft.

5. The reaction force generating apparatus according to claim 4, wherein
   a dimension in the direction of the rotation shaft of the motor is smaller than a dimension in a radial direction of the motor.

6. The reaction force generating apparatus according to claim 4, wherein
   the rotation shaft and the transmission member are disposed in parallel each other, and
   the transmission member is disposed between one end of the rotation shaft and the other end of the rotation shaft in an axial direction thereof.

7. The reaction force generating apparatus according to claim 3, wherein
   the first gear is fixed to the rotation shaft of the motor, and
   the rotation member is disposed between one end of the rotation shaft and the other end of the rotation shaft in a direction of the rotation shaft.

8. The reaction force generating apparatus according to claim 1, further comprises a rotation mechanism in which, when the load applied to the rotation member is released from the rotation member, the first gear is rotated in the second direction.

9. The reaction force generating apparatus according to claim 1, wherein
   the rotation member receives a load applied to the accelerator pedal installed in a vehicle.

10. The reaction force generating apparatus according to claim 1, wherein
    the rotation member is rotatable with respect to the transmission member, and
    the rotation member is provided with a torque limiter which limits a torque to be transmitted between the rotation member and the transmission member to an upper limit value or less.

11. The reaction force generating apparatus according to claim 10, wherein
in a direction along the rotation shaft of the motor, at least one portion in the layout range of the torque limiter and at least one portion of the layout range of the motor are overlapped with each other.

12. The reaction force generating apparatus according to claim 11, wherein
the torque limiter has a torsion coil spring which is press-fitted and fixed to the outer peripheral surface of the transmission member and rotates together with the rotation member,
when the torque of the rotation member is equal to or smaller than the upper limit value corresponding to a frictional force between the torsion coil spring and the transmission member, the torque limiter transmits the torque of the rotation member to the transmission member, and
when the torque of the rotation member exceeds the upper limit value, the torsion coil spring slips with respect to the transmission member, so that the torque of the rotation member is not transmitted to the transmission member.

13. The reaction force generating apparatus according to claim 11, wherein
the torque limiter has:
a load receiving portion fixed to the transmission member; and
an elastic member which presses the rotation member onto the load receiving portion in a direction along the rotation center line of the transmission member,
when the torque of the rotation member is equal to or smaller than the upper limit value corresponding to a frictional force between the rotation member and the load receiving portion, the torque limiter transmits the torque of the rotation member to the transmission member, and
when the torque of the rotation member exceeds the upper limit value, the rotation member slips with respect to the load receiving portion, so that the torque of the rotation member is not transmitted to the transmission member.

* * * * *